US012754687B2

(12) United States Patent
Zhou et al.

(10) Patent No.: US 12,754,687 B2
(45) Date of Patent: Oct. 6, 2026

(54) DATA LOADING BASED ON WORKLOAD PREDICTIONS FOR IMPROVED PERFORMANCE OF CLOUD-BASED SYSTEMS

(71) Applicant: SAP SE, Walldorf (DE)

(72) Inventors: Haotian Zhou, Xi'an (CN); Yu Ma, Xi'an (CN); Xiaotao Wang, Xi'an (CN); Ge Yang, Xi'an (CN); Jing He, Xi'an (CN); Lei Huang, Xi'an (CN)

(73) Assignee: SAP SE, Walldorf (DE)

( * ) Notice: Subject to any disclaimer, the term of this patent is extended or adjusted under 35 U.S.C. 154(b) by 710 days.

(21) Appl. No.: 18/178,613

(22) Filed: Mar. 6, 2023

(65) Prior Publication Data

US 2024/0302990 A1 Sep. 12, 2024

(51) Int. Cl.
*G06F 3/06* (2006.01)
*G06N 3/08* (2023.01)

(52) U.S. Cl.
CPC .......... *G06F 3/0655* (2013.01); *G06F 3/0611* (2013.01); *G06F 3/0673* (2013.01); *G06N 3/08* (2013.01)

(58) Field of Classification Search
CPC .... G06F 3/0655; G06F 3/0611; G06F 3/0673; G06F 16/221; G06F 16/2453; G06F 16/24552; G06F 16/217; G06F 16/2282; G06F 16/24556; G06N 3/08; G06N 20/00
See application file for complete search history.

(56) References Cited

U.S. PATENT DOCUMENTS

| | | | | |
|---|---|---|---|---|
| 8,825,959 | B1 * | 9/2014 | Switakowski | G06F 12/12 711/133 |
| 9,880,816 | B2 | 1/2018 | Zang et al. | |
| 10,445,076 | B1 | 10/2019 | Legler | |
| 11,361,023 | B2 | 6/2022 | Huang et al. | |
| 11,573,940 | B2 * | 2/2023 | Dashevsky | H04L 9/085 |
| 12,050,578 | B2 * | 7/2024 | Palmer | G06F 16/2379 |
| 2016/0335334 | A1 | 11/2016 | Teodorescu et al. | |
| 2017/0060769 | A1 * | 3/2017 | Wires | G06F 12/1018 |

(Continued)

OTHER PUBLICATIONS

U.S. Appl. No. 17/454,088, filed Nov. 9, 2021, Lv et al.

(Continued)

*Primary Examiner* — Angelica Ruiz
(74) *Attorney, Agent, or Firm* — Fish & Richardson P.C.

(57) ABSTRACT

Methods, systems, and computer-readable storage media for receiving a workload period, during which a workload is applied to a database system, providing a set of ML models based on historical data representative of historical executions of the workload over the workload period, each ML model configured to predict a cluster arrival rate curve (cARC), and during execution of the workload period and, for each timeslice of a plurality of timeslice of the workload period: providing a predicted cARC from each ML model, the predicted cARC representative of a predicted workload, determining column visiting times for each of a plurality of columns of each of a plurality of tables stored in the database system, generating a column list based on the column visiting times, and loading column data representative of columns included in the column list into low-latency memory prior to execution of a workload during the respective timeslice.

20 Claims, 7 Drawing Sheets

(56) References Cited

U.S. PATENT DOCUMENTS

| | | | |
|---|---|---|---|
| 2018/0004777 | A1* | 1/2018 | Bulkowski ............ G06F 16/278 |
| 2018/0365647 | A1 | 12/2018 | Huang et al. |

OTHER PUBLICATIONS

U.S. Appl. No. 17/748,140, filed May 19, 2022, Wang et al.
U.S. Appl. No. 17/748,145, filed May 19, 2022, Wang et al.
U.S. Appl. No. 17/835,115, filed Jun. 8, 2022, Ma et al.
Extended European Search Report in European Appln. No. 23204079.0, mailed on Mar. 22, 2024, 11 pages.
Khorramnejad et al., "Performance of integrated workload scheduling and pre- fetching in multimedia mobile cloud computing." Journal of Cloud Computing 7.13, Jul. 2018, 14 pages.
Rehrmann et al., "Oltpshare: the case for sharing in OLTP workloads." Proceedings of the VLDB Endowment 11.12, Aug. 2018, 1769-1780.

* cited by examiner

DATA LOADING BASED ON WORKLOAD PREDICTIONS FOR IMPROVED PERFORMANCE OF CLOUD-BASED SYSTEMS

BACKGROUND

Enterprises can use enterprise applications to support and execute operations. Applications are frequently hosted in cloud computing environments, which can be described as Internet-based computing that provides shared computer processing resources, and data to computers and other devices on demand. Users can establish respective sessions, during which processing resources, and bandwidth are consumed. During a session, for example, a user is provided on-demand access to data through a shared pool of configurable computing resources (e.g., computer networks, servers, storage, applications, and services). The computing resources can be provisioned and released (e.g., scaled) to meet user demand.

A frequency of access to data can result in data being classified as hot data or cold data. In some examples, hot data refers to data that is more frequently accessed, while cold data refers to data that is less frequently accessed. For hot data, in particular, latency should be minimized. To achieve this, low-latency memory can be provided to store data that is determined to be hot data. Low-latency memory provides much faster access to data stored therein (lower latency), while accessing data in other types of storage (e.g., disk) is slower (higher latency). In view of this, data, such as hot data, can be copied to a low-latency memory to enable more rapid access to the data.

SUMMARY

Implementations of the present disclosure are directed to selectively loading data to low-latency memory. More particularly, implementations of the present disclosure are directed to selectively loading data to low-latency memory based on predicted workloads.

In some implementations, actions include receiving a workload period representing a period of time, during which a workload is applied to a database system, providing a set of machine learning (ML) models based on historical data representative of multiple executions of the workload over historical instances of the workload period, each ML model configured to predict a cluster arrival rate curve (cARC), and during execution of the workload period and, for each timeslice of a plurality of timeslice of the workload period: providing a predicted cARC from each ML model, the predicted cARC representative of a predicted workload for a respective timeslice, determining column visiting times for each of a plurality of columns of each of a plurality of tables stored in the database system, generating a column list based on the column visiting times, and loading column data representative of columns included in the column list into low-latency memory prior to execution of a workload during the respective timeslice. Other implementations of this aspect include corresponding systems, apparatus, and computer programs, configured to perform the actions of the methods, encoded on computer storage devices.

These and other implementations can each optionally include one or more of the following features: providing a set of ML models includes receiving the historical data comprising a set of queries, providing a set of query templates based on the set of queries, providing a set of aggregate query templates based on the set of query templates, determining an arrival rate curve (ARC) for each aggregate query template in the set of aggregate query templates, providing a set of cARCs, at least one cARC being generated by clustering multiple aggregate query templates and averaging ARCs of the multiple aggregate query templates, and training a ML model for each cARC in the set of cARCs; a type of each ML model is determined based on a fluctuation pattern of a respective cARC that is to be predicted; types of ML models include a linear regression model, a kernel regression model, and a deep neural network (DNN); generating a column list based on the column visiting times includes sorting the column visiting times in decreasing order with respect to a percentage each column visiting time is of a total column number, and selecting a sub-set of column visiting times based on a threshold percentage of the total column number, columns represented by column visiting times in the sub-set of column visiting times being included in the column list; loading column data representative of columns included in the column list into low-latency memory includes determining whether the low-latency memory has sufficient space to load all column data of columns included in the column list, and selectively swapping data from the low-latency memory to accommodate all column data of columns included in the column list; and selectively swapping data from the low-latency memory includes executing least recently used (LRU) to move data from the low-latency memory to a data store.

The present disclosure also provides a computer-readable storage medium coupled to one or more processors and having instructions stored thereon which, when executed by the one or more processors, cause the one or more processors to perform operations in accordance with implementations of the methods provided herein.

The present disclosure further provides a system for implementing the methods provided herein. The system includes one or more processors, and a computer-readable storage medium coupled to the one or more processors having instructions stored thereon which, when executed by the one or more processors, cause the one or more processors to perform operations in accordance with implementations of the methods provided herein.

It is appreciated that methods in accordance with the present disclosure can include any combination of the aspects and features described herein. That is, methods in accordance with the present disclosure are not limited to the combinations of aspects and features specifically described herein, but also include any combination of the aspects and features provided.

The details of one or more implementations of the present disclosure are set forth in the accompanying drawings and the description below. Other features and advantages of the present disclosure will be apparent from the description and drawings, and from the claims.

DESCRIPTION OF DRAWINGS

Like reference symbols in the various drawings indicate like elements.

DETAILED DESCRIPTION

Figure 1:
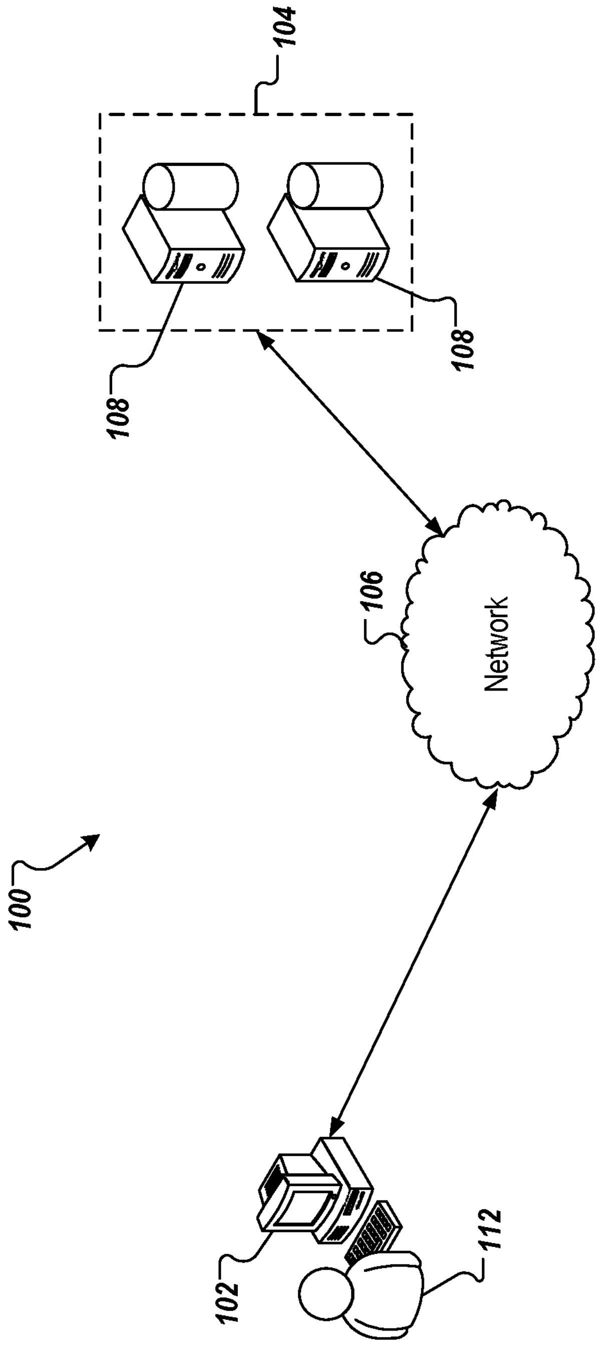
FIG. 1 depicts an example architecture that can be used to execute implementations of the present disclosure.

Implementations of the present disclosure are directed to selectively loading data to low-latency memory. More particularly, implementations of the present disclosure are directed to selectively loading data to low-latency memory based on predicted workloads. In some implementations, actions include receiving a workload period representing a period of time, during which a workload is applied to a database system, providing a set of machine learning (ML) models based on historical data representative of multiple executions of the workload over historical instances of the workload period, each ML model configured to predict a cluster arrival rate curve (cARC), and during execution of the workload period and, for each timeslice of a plurality of timeslice of the workload period: providing a predicted cARC from each ML model, the predicted cARC representative of a predicted workload for a respective timeslice, determining column visiting times for each of a plurality of columns of each of a plurality of tables stored in the database system, generating a column list based on the column visiting times, and loading column data representative of columns included in the column list into low-latency memory prior to execution of a workload during the respective timeslice.

To provide further context for implementations of the present disclosure, and as introduced above, enterprises can use enterprise applications to support and execute operations. In some arrangements, applications interact with database systems to store and retrieve data. For example, an application can query a database system to read data from and/or write data to a data storage maintained within the database system. Accessing data in a database system implies latency, which can be described as a time between issuing of a query to the database system and received a response to the query. Relatively long latency can be characterized as poor performance of the database system and can hinder execution of downstream actions (e.g., actions that are to be executed based on data that is accessed).

A frequency of access to data can result in data being classified as hot data or cold data. In some examples, hot data refers to data that is more frequently accessed, while cold data refers to data that is less frequently accessed. For hot data, in particular, latency should be minimized. To achieve this, a low-latency memory can be provided to store data that is determined to be hot data. Low-latency memory provides a much faster access to data stored therein (lower latency), while accessing data in a database system is slower (higher latency). In view of this, data, such as hot data, can be copied to a low-latency memory to enable more rapid access to the data. While database systems have advantages in querying and storage of data, their relatively higher latency is a disadvantage.

Workloads are applied by applications, which result in data being accessed. For example, a workload can include a set of queries, execution of which results in data being read from and/or written to data stores (e.g., one or more tables storing data). Workloads in cloud-based systems can vary based on scenarios. However, for some cases, workloads can be similar over different workload periods (e.g., a period of time, during which a workload is executed). For example, and without limitation, workloads in a banking scenario are similar each weekday (e.g., 24 hour period). In this example, customer transactions frequently occur from 8 AM to 10 PM, and the nighttime is often filled with administrative tasks, such as account checks between banking institutions. As another non-limiting example, transactions in an electronic commerce (e-commerce) scenario are similar during weekdays, but can see an increase on weekends and/or public holidays.

As noted above, hot data can be loaded to low-latency memory for more efficient access during workloads when the data is needed. Although workloads are similar during certain workload periods for some scenarios (e.g., daily, weekly, monthly, seasonally), it is still unknown which data needs to be loaded to low-latency memory beforehand. This results in frequent data swapping between memory types during workload execution. In some examples, data swapping includes moving data from one memory type (e.g., low-latency memory) to another memory type (e.g., high-latency memory). Overall system performance is negatively impacted by data swapping between memory. For example, execution of transactions can take longer due to additional time expended to perform data swapping, and computing resources are expended to execute the data swapping.

In view of the above context, implementations of the present disclosure provide a data loading system for selectively loading data to low-latency memory based on predicted workloads. As described in further detail herein, implementations of the present disclosure provide a set of ML models that are used to predict data that may be accessed during timeslices of a workload period, and load data for respective timeslices based on the predictions. More particularly, predictions of the ML models are used to determine access frequencies to each table in a set of tables and, for each table, a set of columns. The access frequencies are used to identify data as hot data before the data is accessed. The so-identified hot data is loaded into low-latency memory prior to expected access. In this manner, the hot data is already available in low-latency memory when needed, thereby improving the performance of the database system and conserving technical resources (e.g., by mitigating data swapping).

FIG. 1 depicts an example architecture 100 in accordance with implementations of the present disclosure. In the depicted example, the example architecture 100 includes a client device 102, a network 106, and a server system 104. The server system 104 includes one or more server devices and databases 108 (e.g., processors, memory). In the depicted example, a user 112 interacts with the client device 102.

In some examples, the client device 102 can communicate with the server system 104 over the network 106. In some examples, the client device 102 includes any appropriate type of computing device such as a desktop computer, a laptop computer, a handheld computer, a tablet computer, a personal digital assistant (PDA), a cellular telephone, a network appliance, a camera, a smart phone, an enhanced general packet radio service (EGPRS) mobile phone, a media player, a navigation device, an email device, a game console, or an appropriate combination of any two or more of these devices or other data processing devices. In some implementations, the network 106 can include a large computer network, such as a local area network (LAN), a wide area network (WAN), the Internet, a cellular network, a telephone network (e.g., PSTN) or an appropriate combination thereof connecting any number of communication devices, mobile computing devices, fixed computing devices and server systems.

In some implementations, the server system 104 includes at least one server and at least one data store. In the example of FIG. 1, the server system 104 is intended to represent various forms of servers including, but not limited to a web server, an application server, a proxy server, a network server, and/or a server pool. In general, server systems accept requests for application services and provides such services to any number of client devices (e.g., the client device 102 over the network 106). In some examples, the server system 104 can provision a cloud platform that hosts one or more cloud-based applications.

In accordance with implementations of the present disclosure, the server system 104 can host a database system (e.g., a CMDB system) that enables access to data. For example, queries can be submitted to the database system to read and/or write data stored therein. In some implementations, at least a portion of data stored in the database system is to be stored in a low-latency memory (e.g., non-volatile random-access memory (RAM)) to enable more rapid access to the data. Queries can be executed over data objects stored within the low-latency memory.

Figure 2:
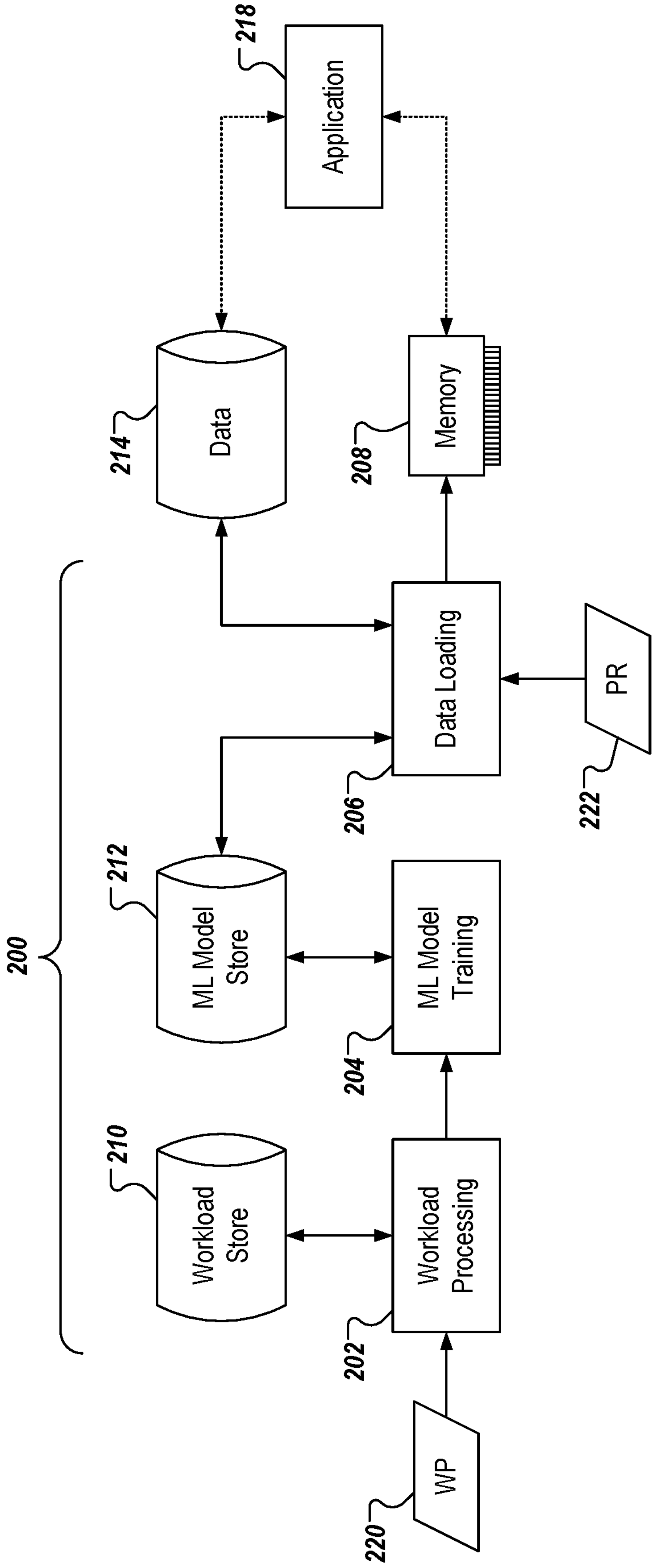
FIG. 2 depicts an example conceptual architecture for data loading in accordance with implementations of the present disclosure.

FIG. 2 depicts an example conceptual architecture 200 for data loading in accordance with implementations of the present disclosure. In the example of FIG. 2, the conceptual architecture 200 includes a workload processing module 202, a ML model training module 204, a data loading module 206, a workload store 210, and a ML model store 212. A memory 208 and a data store 214 are also depicted in FIG. 2. As described in further detail herein, the data store 214 can store data in high-latency memory (e.g., disk-based storage) and the data loading module 206 can selectively load data from the data store 214 to the memory 208, which is provided as low-latency memory (e.g., RAM). In some examples, the memory 208 and the data store 214 are provided in a database system. In some examples, an application 218 interacts with the database system to access data stored in one or more of the memory 208 and the data store 214.

In accordance with implementations of the present disclosure, the workload processing module 202 determines a set of cluster arrival rate curves (cARCs) based on a workload period (WP) 220. The workload period 220 represents a period of time, during which a workload is to be executed on a database system. By way of non-limiting example, a workload period can include a day (e.g., 24-hour period). In general, the workload period is representative of a repeating period of time, during which a workload is executed (e.g., weekday, weekend day). In some implementations, the workload processing module 202 retrieves historical data from the workload store 210 for the workload period 220. The historical data is representative of one or more executions of the workload over the workload period 220.

In some implementations, the historical data includes a set of queries that have been executed on the database system during the workload period 220. In some examples, a query can be provided as a structured query language (SQL) query that is executed on the database system to interact with data during the workload period 220. In some implementations, the workload processing module 202 generates a set of query templates. For example, for each query in the set of queries, the workload processing module 202 provides a query template by replacing any constants with a value placeholder (e.g., the $ character). In some examples, and without limitation, constants include values in WHERE clause predicates, SET fields in UPDATE statements, and VALUES fields in INSERT statements.

In some implementations, a set of aggregate query templates is provided from the set of query templates. In some examples, an aggregate query template is provided by aggregating one or more query templates into a single aggregate query template. For example, query templates can be aggregated by comparing semantic features, where query templates that are determined to be semantically similar are aggregated to provide an aggregate query template. In some examples, query templates are considered semantically similar, if the query statement (e.g., SQL statement) come from the same type (e.g., SELECT, UPDATE, DELETE, INSERT), and all of the involved tables and columns are the same. In some implementations, for each aggregate query template in the set of aggregate query templates, an arrival rate curve (ARC) is determined. In some examples, the ARC for an aggregate query template is provided as the number of times that queries represented by the aggregate query template are executed during the workload period 220.

Figure 3A:
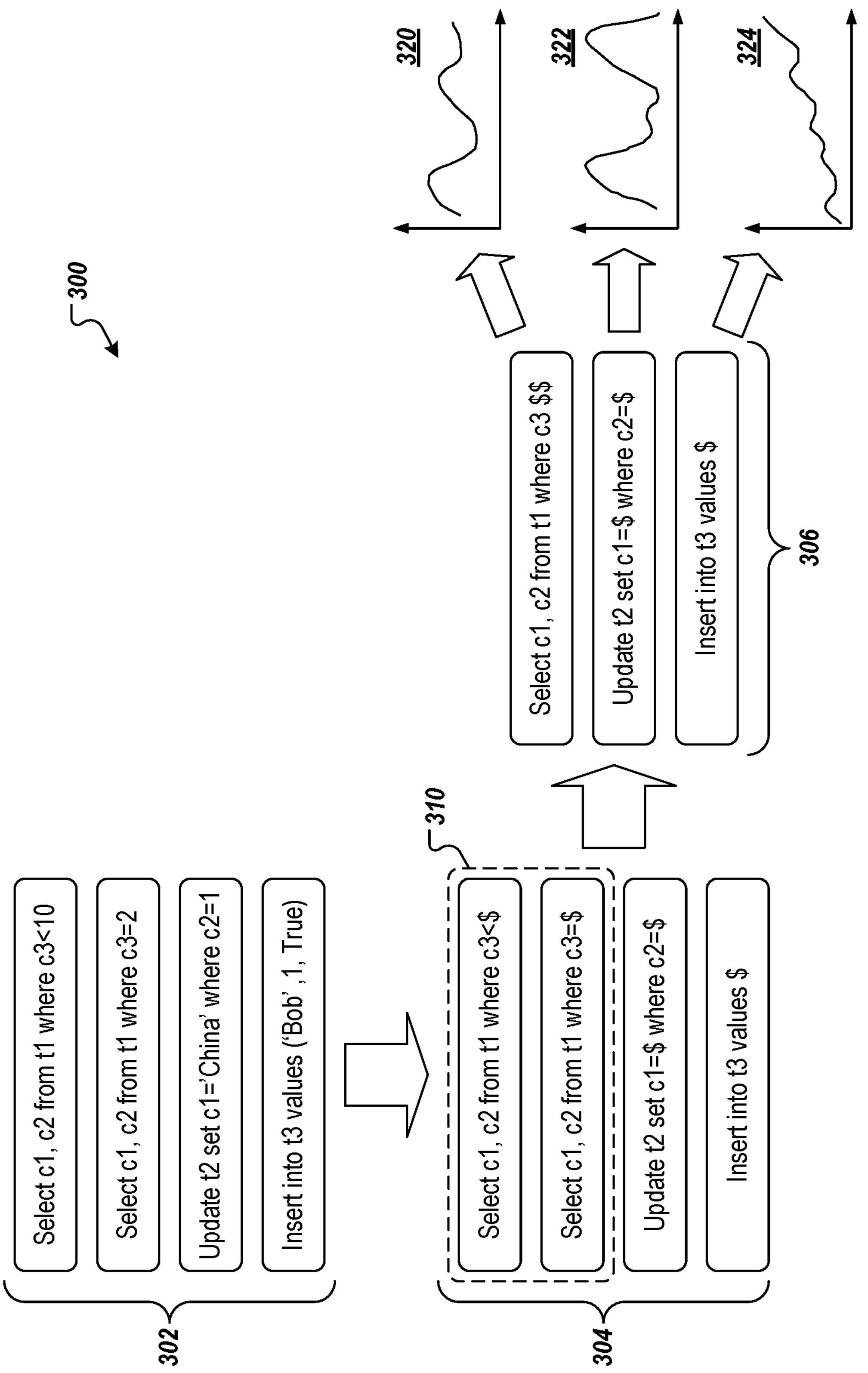
FIG. 3A depicts example processing of workloads in accordance with implementations of the present disclosure.

FIG. 3A depicts example processing 300 of workloads in accordance with implementations of the present disclosure. In the example of FIG. 3A, a set of queries 302 is provided for a workload executed during a workload period. For sake of simplicity, the set of queries 302 includes four queries. It is contemplated, however, that sets of queries can include hundreds, thousands, even millions of queries, for example. A set of query templates 304 is provided from the set of queries 302. For example, and as described herein, query templates are provided by replacing any constants with a value placeholder, the $ character in the example of FIG. 3A. For example, constants include values in WHERE clause predicates, SET fields in UPDATE statements, and VALUES fields in INSERT statements, as represented in FIG. 3A.

A set of aggregate query templates 306 is provided from the set of query templates 304. In the example of FIG. 3A, a sub-set of query templates 310 are determined to be semantically similar and are represented as an aggregate query template in the set of aggregate query templates 306. As also represented in the example of FIG. 3A, query templates that are not determined to be semantically similar to any other query template can be individually passed into the set of aggregate query templates as respective aggregate query templates.

As depicted in FIG. 3A, ARCs 320, 322, 324 are provided for respective aggregate query templates in the set of aggregate query templates 306. Each ARC 320 represents a trace indicating a number of times queries represented by an aggregate query template are executed during the workload period, for which the set of queries 302 is provided.

Referring again to FIG. 2, the workload processing module 202 processes the set of ARCs to generate a set of cARCs. For example, one or more ARCs in the set of ARCs can be clustered (grouped) and a cARC is generated for the cluster. In some examples, two or more ARCs can be clustered based on similarity (e.g., in fluctuation patterns). In some examples, an ARC embedding is provided for each ARC by, for example, processing each ARC through a pre-trained ARC embedder. Each ARC embedding can be provided as an n-dimensional vector representing a respective ARC. In some examples, ARC embeddings are compared to determine whether the respective ARCs are to be included in a cluster. For example, a cosine distance can be determined between ARC embeddings and, if the cosine distance meets a threshold distance (e.g., ≥0.9), the ARCs represented by the ARC embeddings are clustered in a cluster. In some examples, if an ARC embedding is not determined to be sufficiently similar to any other ARC embedding, the respective ARC is included in its own cluster (e.g., a cluster of one ARC). In some examples, a cARC is provided for each cluster. For example, a cARC is provided by averaging the arrival rates of all ARCs included in the cluster.

Figure 3B:
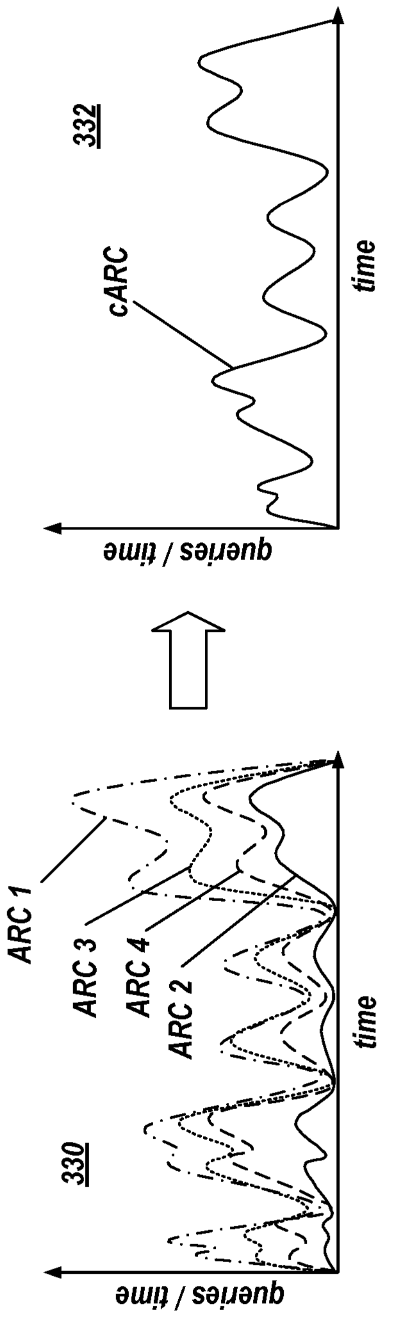
FIG. 3B depicts example generation of a cluster arrival rate curve (cARC) in accordance with implementations of the present disclosure.

FIG. 3B depicts example generation of a cARC in accordance with implementations of the present disclosure. In the example of FIG. 3B, a graph 330 depicts ARCs of a cluster of ARCs. That is, in this example, ARC embeddings of the ARCs were compared and determined to be sufficiently similar that the ARCs, and thus the respective, underlying aggregate query templates, are clustered together in a cluster. In the example of FIG. 3B, a graph 332 depicts a cARC determined for the ARCs of the graph 330. For example, the cARC of the graph 332 is determined as the average arrival rate of the ARCs of the graph 330. Accordingly, the cARC of the graph 332 is representative of multiple aggregate query templates represented by the ARCs of the graph 330.

Referring again to FIG. 2, the workload processing module 202 provides a set of cARCs to the ML model training module 204, which trains a set of ML models based on the set of cARCs. In some examples, the ML training module 204 trains a ML model for each cARC in the set of cARCs. In some examples, for each cARC, the ML training module 204 selects a type of ML model that is to be used for the respective ARC. Example types of ML models can include, without limitation, a linear regression model, a kernel regression model, and a long short-term memory (LSTM) deep neural network. In some examples, a linear regression model is used for a cARC that is representative of a linear workload, a kernel regression model is used for a cARC that is representative of workloads having spikes, and a LSTM DNN is used for a cARC that is representative of workloads having periodic fluctuations.

Figure 4A:
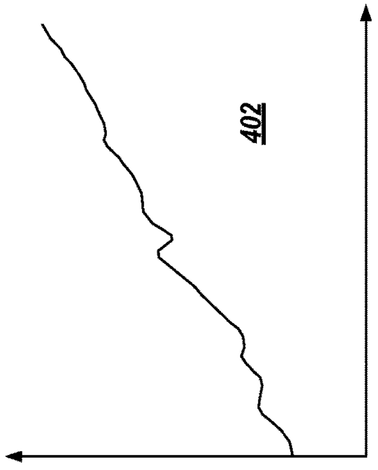
FIGS. 4A-4C depict respective examples of cARCs.
Figure 4B:
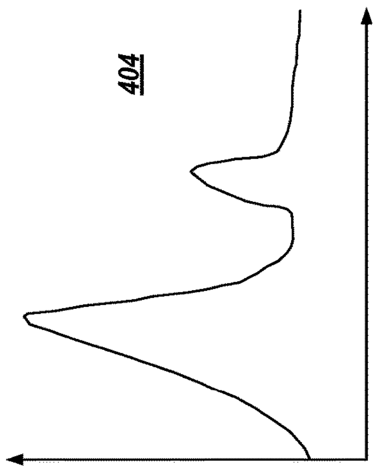
Figure 4C:
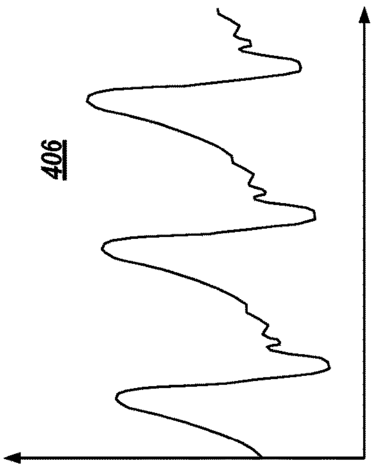

FIGS. 4A-4C depict respective examples of cARCs. More particularly, and as described in further detail herein, FIG. 4A depicts a graph 402 including a cARC representative of a workload appropriate for a first type of ML model, FIG. 4B depicts a graph 404 including a cARC representative of a workload appropriate for a second type of ML model, and FIG. 4C depicts a graph 402 including a cARC representative of a workload appropriate for a second type of ML model.

Referring again to FIG. 2, the ML model training module 204 analyzes a cARC to determine what the cARC workload will be. For example, the cARC can represent one of a linear workload, a workload with spikes, and a workload with periodic fluctuations. In some examples, a ML model of a type appropriate for the cARC can be selected from a set of ML models based on the analysis. For example, the ML model training module 204 can process each cARC through a pre-trained ML model that classifies the cARC as one of linear, spike, and fluctuation, then selects the type of ML model for the cARC based on the class. The set of ML models can include a range of types that is sufficient to address any expected pattern of workload. In some examples, each ML model is trained using historical data and/or real-time data that is provided during a sampling period.

In general, a ML model is iteratively trained, where, during an iteration, one or more parameters of the ML model are adjusted, and an output is generated based on the training data. For each iteration, a loss value is determined based on a loss function. The loss value represents a degree of accuracy of the output of the ML model. The loss value can be described as a representation of a degree of difference between the output of the ML model and an expected output of the ML model (the expected output being provided from training data). In some examples, if the loss value does not meet an expected value (e.g., is not equal to zero), parameters of the ML model are adjusted in another iteration of training. In some instances, this process is repeated until the loss value meets the expected value.

In accordance with implementations of the present disclosure, a sub-set of ML models is determined from the set of ML models. In some examples, the sub-set of ML models is determined to represent a threshold percentage (e.g., 90%) of queries expected to be executed in a future workload period, for which the set of ML models are provided (e.g., the workload period 220). For example, during a first timeslice, a workload can be predicted using each ML model and it can be determined that the ML model for linear relationships is more accurate than the other ML models. Consequently, the ML model for linear relationships is selected as the current model for the cARC for the first timeslice. Continuing with this example, for a second timeslice a workload can be predicted using each ML model and it can be determined that the ML model for spikes is more accurate than the other ML models. Consequently, the ML model for spikes is selected as the current model for the cARC for the second timeslice. In some examples, the sub-set of ML models is stored in the ML model store 212.

In some implementations, the data loading module 206 receives a prediction request 222. The prediction request can be representative of a workload period, for which predictions are to be made for selectively loading data to the memory 208. For example, the prediction request 222 can be issued by the application 218 prior to the onset of the workload period. In some implementations, the prediction request indicates timeslices of the workload period and the data loading module 206 determines predictions for each timeslice and selectively loads data on a timeslice-by-timeslice basis, as described in further detail herein. For example, and without limitation, the workload period can be 24 hours (e.g., 00:00-24:00) and each timeslice can be 1 hour to provide 24 timeslices for the workload period. As another non-limiting example, the workload period can be a 5-day work week (e.g., Monday-Friday) and each timeslice can be 1 day to provide 5 timeslices for the workload period.

In some implementations, the data loading module 206 retrieves a sub-set of ML models from the ML model store 212 for the workload period indicated in the prediction request 222. The data loading module 206 uses the sub-set of ML models to predict data that will be accessed for each timeslice of the workload period. The data loading module 206 selectively loads at least a portion of the data (that is predicted using the sub-set of ML models) to low-latency memory before the workload is executed for a respective timeslice.

In further detail, each ML model is used to provide a respective predicted cARC for an upcoming timeslice, also referred to as prediction timeslice (PTS) herein. Using the predicted cARC of the PTS, a frequency for each column in each table is determined. For example, reverse mapping is applied to the predicted cARC to provide a column visiting frequency $$(f_C^T)$$

for a time interval (dt) of the PTS and a column visiting time $$\left(VT_C^T\right)$$

for each cluster. In general, the column visiting frequency is the number of times a column (C) of a table (T) is visited during dt, and the column visiting times is determined as the are between the cARC and the x-axis. With regard to reverse mapping, and as noted above, a cARC is a cluster of multiple ARCs, and can be described as a sum of all of the ARCs in the cluster. To reverse map back to each ARC, a ratio of each ARC is recorded and is used to multiply by the sum. The following example relationships can be provided:

$$f_C^T = \frac{\text{Visited times for column } C \text{ in table } T \text{ during } dt}{dt}$$

$$VT_C^T = \int_{time\ point\ x}^{time\ point\ x+PTS} f_C^T(t)dt$$

where t is any time point.

In some examples, a total column number (TCN) is determined as the total time that columns of tables have been visited during the period. The following example relationship can be provided:

$$TCN_{t1}^{t2} = \sum_{k=0}^{n} \int_{t1}^{t2} f_{C_k}^{T_k}(t)dt$$

In some examples, TCN is used to determine which column or columns can be regarded as the majority after the prediction. For example, the column visiting times of respective columns can be compared to the TCN to determine a respective percentage that indicate the percentage of time the respective column is visited with respect to the TCN. Columns having higher percentages consume more of the TCN than columns with lower percentages. As described in further detail herein, the columns corresponding to the column visiting times that make up at least a threshold percentage (e.g., 90%) of the TCN can be determined as hot data.

In some implementations, the data loading module 206 sorts the column visiting times for each cluster according to the time slice. For example:

$$VT_{C2}^{T3} > VT_{C1}^{T3} > VT_{C5}^{T1} > VT_{C2}^{T2} > VT_{C1}^{T1} > VT_{C4}^{T3} > \ldots$$

The sum of $$VT_C^T,$$

which together cover at least 90% of the total, for example, indicates a column list, which represents the hot data determined for the timeslice. For example:

$$VT_{C2}^{T3} + VT_{C1}^{T3} + VT_{C5}^{T1} + VT_{C2}^{T2} + VT_{C1}^{T1} > 90\% * TCN_t^{t+PTS}$$

In some implementations, the data loading module 206 loads the columns represented in the column list into the memory 208. However, multiple situations can be considered based on an amount of free memory available in the memory 208. For example, if the memory is sufficient to hold all of the columns represented in the column list, all of the column data is loaded into the memory 208. As another example, if the memory is insufficient to hold all of the columns represented in the column list, column data can be switched out from the memory 208 to the data store 214. For example, the algorithm least recently used (LRU) can be executed to change the least used pages out of the memory 208. In this manner, space is made available in the memory 208 for the column data. In some examples, the size of the column data is compared to the size of memory available, if the available memory is too small, LRU is applied to move least recently used data back to disk-based memory to make more space available for the column data that is to be loaded. For example, if c1, c2, c3, c4, c5 are to be loaded into memory, first the data already stored in memory is compared with these columns to determine whether any are already stored into the memory. In this example, it can be determined that c1 is already in the memory. It is determined whether the available memory is sufficient to load c2-c5. If yes, c2-c5 are loaded into memory. If no, LRU is used to move least recently used data (e.g., c6 and c7) out to the disk-based memory and make sufficient space for c2-c5. LRU can be described as a page (memory) replacement technique, in which the page that is least recently used is replaced by a new page (e.g., a page with the column data). In this manner, any page that has been unused for a longer period of time than the other pages is replaced with the new page.

Figure 5:
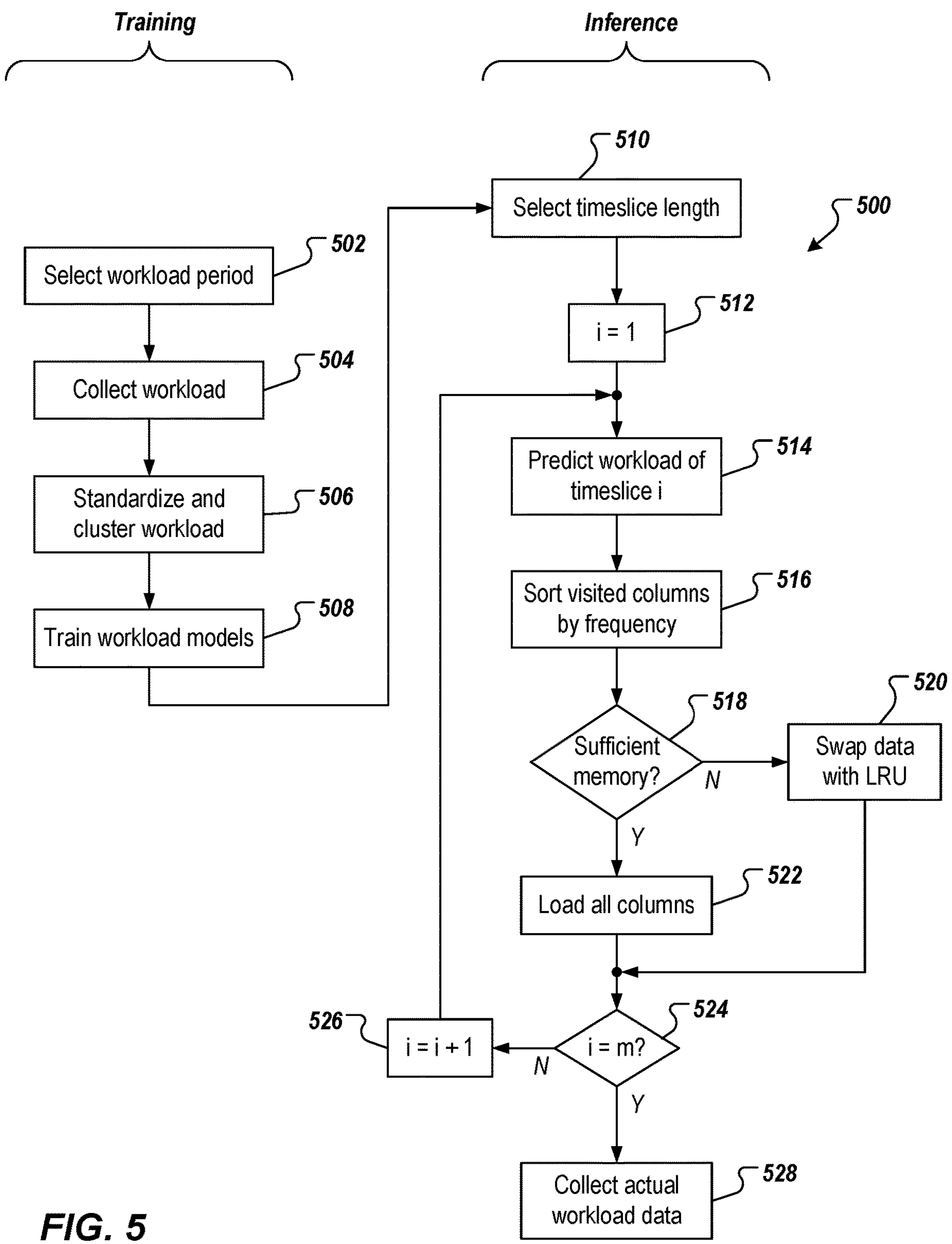
FIG. 5 depicts an example process that can be executed in accordance with implementations of the present disclosure.

FIG. 5 depicts an example process 500 that can be executed in accordance with implementations of the present disclosure. In some examples, the example process 500 is provided using one or more computer-executable programs executed by one or more computing devices. In some examples, the example process 500 is performed to selectively load data to low-latency memory based on predicted workload. In the example of FIG. 5, the example process can include a training phase and an inference phase. During the training phase, ML models are trained as described herein. During the inference phase, one or more of the ML models is used to predict workloads and selectively load data (e.g., column data) to low-latency memory for production use.

A workload period is selected (502). For example, and as described herein, a workload period can be selected for predicting a workload applied to a database system. An example workload period can include a day (e.g., a weekday, a weekend day). As discussed herein with reference to FIG. 2, the workload period 220 can be provided to the workload processing module 202. A workload is collected (504). For example, and as described herein, the workload processing module 202 retrieves historical data from the workload store 210 for the workload period 220. The historical data is representative of one or more executions of the workload over the workload period 220. In some examples, the historical data includes a set of queries that have been executed on the database system during the workload period 220.

The workload is standardized and clustered (506). For example, and as described herein, the workload processing module 202 generates a set of query templates. For example, for each query in the set of queries, the workload processing module 202 provides a query template by replacing any constants with a value placeholder (e.g., the $ character). In some examples, and without limitation, constants include values in WHERE clause predicates, SET fields in UPDATE statements, and VALUES fields in INSERT statements. A set of aggregate query templates is provided from the set of query templates. In some examples, an aggregate query template is provided by aggregating one or more query templates into a single aggregate query template. For each aggregate query template in the set of aggregate query templates, an ARC is determined. The workload processing module 202 processes the set of ARCs to generate a set of cARCs. For example, one or more ARCs in the set of ARCs can be clustered (grouped) and a cARC is generated for the cluster. For example, a cARC is provided by averaging the arrival rates of all ARCs included in the cluster.

Workload ML models are trained (508). For example, and as described herein, the ML model training module 204 trains a set of ML models based on the set of cARCs. In some examples, the ML training module 204 trains a ML model for each cARC in the set of cARCs. A sub-set of ML models is determined from the set of ML models. In some examples, the sub-set of ML models is determined to represent a threshold percentage (e.g., 90%) of queries expected to be executed in a future workload period, for which the set of ML models are provided (e.g., the workload period 220).

A timeslice length is selected (510). For example, and as described herein, the timeslice length can represent a sup-period of time within a workload period for predicting workload using one or more ML models. By way of non-limiting example, the workload period can be 24 hours and the timeslice can be 1 hour (e.g., 24 timeslices within the workload period). A counter i is set equal to 1 (512). In some examples, the counter i is used to track the timeslices data has been predicted for. A workload of timeslice i is predicted (514). For example, and as described herein, each ML model in a sub-set of ML models determined for the workload period is used to provide a respective predicted cARC for timeslice i. Using the predicted cARC of the PTS, a frequency for each column in each table is determined. For example, reverse mapping is applied to the each predicted cARC to provide a column visiting frequency $$(f_C^T),$$

a column visiting time $$(VT_C^T),$$

and a total column number (TCN).

Visited columns are sorted by frequency and a column list is determined (516). For example, and as described herein, visited columns are put in decreasing order based on respective percentages of time each makes up of the total column number (TCN). The columns corresponding to the column visiting times that make up at least a threshold percentage (e.g., 90%) of the TCN are included in the column list. The columns of the column list are expected to be accessed when the workload of timeslice i is executed. As such, the column data of the columns of the column list is loaded to low-latency memory in expectation of access requests.

It is determined whether there is sufficient space in low-latency memory to store the column data (518). For example, and as described herein, a size of the column data that is to be loaded can be compared to a size of memory available in the low-latency memory. If the size of the column data that is to be loaded is less than the size of memory available in the low-latency memory, it is determined that there is sufficient space in low-latency memory to store the column data. Otherwise, it is determined that there is insufficient space in low-latency memory to store the column data. If there is insufficient space in low-latency memory to store the column data, column data is swapped using LRU (520). For example, and as described herein, if there is insufficient space, (old) column data currently stored in the low-latency memory is swapped out (e.g., using LRU) to make space available, and the (new) column data is stored in the low-latency memory. If there is sufficient space in low-latency memory to store the column data, all of the column data is loaded (522). The workload is performed for the timeslice i, which can include accessing column data stored in the low-latency memory.

It is determined whether i is equal to m (524). For example, m can be the total number of timeslices for the workload period (e.g., m=24), and it can be determined whether predictions and data loading has been executed for each timeslice. If i is not equal to m, i is incremented (526) and the example process loops back to predict for a next timeslice. If i is equal to m, actual workload data is collected (528) and the example process 500 ends. For example, and as described herein, the actual workload that is executed during each of the timeslices of the workload period is collected from memory. In this manner, the actual workload can be used as feedback to, for example, retrain the ML models.

Figure 6:
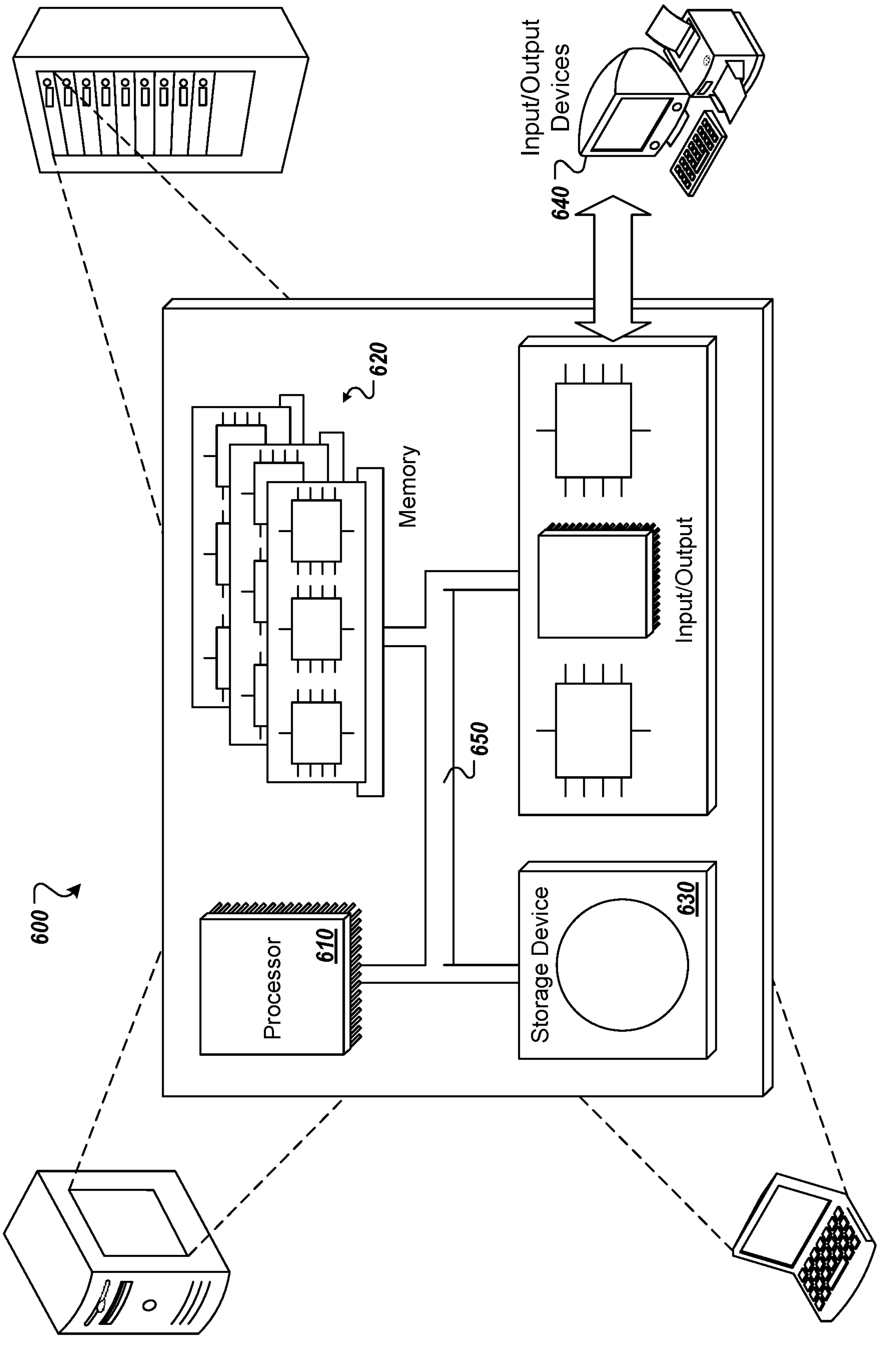
FIG. 6 is a schematic illustration of example computer systems that can be used to execute implementations of the present disclosure.

Referring now to FIG. 6, a schematic diagram of an example computing system 600 is provided. The system 600 can be used for the operations described in association with the implementations described herein. For example, the system 600 may be included in any or all of the server components discussed herein. The system 600 includes a processor 610, a memory 620, a storage device 630, and an input/output device 640. The components 610, 620, 630, 640 are interconnected using a system bus 650. The processor 610 is capable of processing instructions for execution within the system 600. In some implementations, the processor 610 is a single-threaded processor. In some implementations, the processor 610 is a multi-threaded processor. The processor 610 is capable of processing instructions stored in the memory 620 or on the storage device 630 to display graphical information for a user interface on the input/output device 640.

The memory 620 stores information within the system 600. In some implementations, the memory 620 is a computer-readable medium. In some implementations, the memory 620 is a volatile memory unit. In some implementations, the memory 620 is a non-volatile memory unit. The storage device 630 is capable of providing mass storage for the system 600. In some implementations, the storage device 630 is a computer-readable medium. In some implementations, the storage device 630 may be a floppy disk device, a hard disk device, an optical disk device, or a tape device. The input/output device 640 provides input/output operations for the system 600. In some implementations, the input/output device 640 includes a keyboard and/or pointing device. In some implementations, the input/output device 640 includes a display unit for displaying graphical user interfaces.

The features described can be implemented in digital electronic circuitry, or in computer hardware, firmware, software, or in combinations of them. The apparatus can be implemented in a computer program product tangibly embodied in an information carrier (e.g., in a machinereadable storage device, for execution by a programmable processor), and method steps can be performed by a programmable processor executing a program of instructions to perform functions of the described implementations by operating on input data and generating output. The described features can be implemented advantageously in one or more computer programs that are executable on a programmable system including at least one programmable processor coupled to receive data and instructions from, and to transmit data and instructions to, a data storage system, at least one input device, and at least one output device. A computer program is a set of instructions that can be used, directly or indirectly, in a computer to perform a certain activity or bring about a certain result. A computer program can be written in any form of programming language, including compiled or interpreted languages, and it can be deployed in any form, including as a stand-alone program or as a module, component, subroutine, or other unit suitable for use in a computing environment.

Suitable processors for the execution of a program of instructions include, by way of example, both general and special purpose microprocessors, and the sole processor or one of multiple processors of any kind of computer. Generally, a processor will receive instructions and data from a read-only memory or a random access memory or both. Elements of a computer can include a processor for executing instructions and one or more memories for storing instructions and data. Generally, a computer can also include, or be operatively coupled to communicate with, one or more mass storage devices for storing data files; such devices include magnetic disks, such as internal hard disks and removable disks; magneto-optical disks; and optical disks. Storage devices suitable for tangibly embodying computer program instructions and data include all forms of non-volatile memory, including by way of example semiconductor memory devices, such as EPROM, EEPROM, and flash memory devices; magnetic disks such as internal hard disks and removable disks; magneto-optical disks; and CD-ROM and DVD-ROM disks. The processor and the memory can be supplemented by, or incorporated in, ASICs (application-specific integrated circuits).

To provide for interaction with a user, the features can be implemented on a computer having a display device such as a CRT (cathode ray tube) or LCD (liquid crystal display) monitor for displaying information to the user and a keyboard and a pointing device such as a mouse or a trackball by which the user can provide input to the computer.

The features can be implemented in a computer system that includes a back-end component, such as a data server, or that includes a middleware component, such as an application server or an Internet server, or that includes a front-end component, such as a client computer having a graphical user interface or an Internet browser, or any combination of them. The components of the system can be connected by any form or medium of digital data communication such as a communication network. Examples of communication networks include, for example, a LAN, a WAN, and the computers and networks forming the Internet.

The computer system can include clients and servers. A client and server are generally remote from each other and typically interact through a network, such as the described one. The relationship of client and server arises by virtue of computer programs running on the respective computers and having a client-server relationship to each other.

In addition, the logic flows depicted in the figures do not require the particular order shown, or sequential order, to achieve desirable results. In addition, other steps may be provided, or steps may be eliminated, from the described flows, and other components may be added to, or removed from, the described systems. Accordingly, other implementations are within the scope of the following claims.

A number of implementations of the present disclosure have been described. Nevertheless, it will be understood that various modifications may be made without departing from the spirit and scope of the present disclosure. Accordingly, other implementations are within the scope of the following claims.

What is claimed is:

1. A computer-implemented method for selectively loading data to low-latency memory, the method being executed by one or more processors and comprising:

receiving a workload period representing a period of time, during which a workload is applied to a database system;

providing a set of machine learning (ML) models based on historical data representative of multiple executions of the workload over historical instances of the workload period, each ML model configured to predict a cluster arrival rate curve (cARC); and during execution of the workload period and, for each timeslice of a plurality of timeslice of the workload period:

providing a predicted cARC from each ML model, the predicted cARC representative of a predicted workload for a respective timeslice, determining column visiting times for each of a plurality of columns of each of a plurality of tables stored in the database system, generating a column list based on the column visiting times, and loading column data representative of columns included in the column list into low-latency memory prior to execution of a workload during the respective timeslice.

2. The method of claim 1, wherein providing a set of ML models comprises:

receiving the historical data comprising a set of queries;

providing a set of query templates based on the set of queries;

providing a set of aggregate query templates based on the set of query templates;

determining an arrival rate curve (ARC) for each aggregate query template in the set of aggregate query templates;

providing a set of cARCs, at least one cARC being generated by clustering multiple aggregate query templates and averaging ARCs of the multiple aggregate query templates; and training a ML model for each cARC in the set of cARCs.

3. The method of claim 1, wherein a type of each ML model is determined based on a fluctuation pattern of a respective cARC that is to be predicted.

4. The method of claim 3, wherein types of ML models comprise a linear regression model, a kernel regression model, and a deep neural network (DNN).

5. The method of claim 1, wherein generating a column list based on the column visiting times comprises:

sorting the column visiting times in decreasing order with respect to a percentage each column visiting time is of a total column number; and selecting a sub-set of column visiting times based on a threshold percentage of the total column number, columns represented by column visiting times in the sub-set of column visiting times being included in the column list.

6. The method of claim 1, wherein loading column data representative of columns included in the column list into low-latency memory comprises:

determining whether the low-latency memory has sufficient space to load all column data of columns included in the column list; and selectively swapping data from the low-latency memory to accommodate all column data of columns included in the column list.

7. The method of claim 6, wherein selectively swapping data from the low-latency memory comprises executing least recently used (LRU) to move data from the low-latency memory to a data store.

8. A non-transitory computer-readable storage medium coupled to one or more processors and having instructions stored thereon which, when executed by the one or more processors, cause the one or more processors to perform operations for selectively loading data to low-latency memory, the operations comprising:

receiving a workload period representing a period of time, during which a workload is applied to a database system;

providing a set of machine learning (ML) models based on historical data representative of multiple executions of the workload over historical instances of the workload period, each ML model configured to predict a cluster arrival rate curve (cARC); and during execution of the workload period and, for each timeslice of a plurality of timeslice of the workload period:

providing a predicted cARC from each ML model, the predicted cARC representative of a predicted workload for a respective timeslice, determining column visiting times for each of a plurality of columns of each of a plurality of tables stored in the database system, generating a column list based on the column visiting times, and loading column data representative of columns included in the column list into low-latency memory prior to execution of a workload during the respective timeslice.

9. The non-transitory computer-readable storage medium of claim 8, wherein providing a set of ML models comprises:

receiving the historical data comprising a set of queries;

providing a set of query templates based on the set of queries;

providing a set of aggregate query templates based on the set of query templates;

determining an arrival rate curve (ARC) for each aggregate query template in the set of aggregate query templates;

providing a set of cARCs, at least one cARC being generated by clustering multiple aggregate query templates and averaging ARCs of the multiple aggregate query templates; and training a ML model for each cARC in the set of cARCs.

10. The non-transitory computer-readable storage medium of claim 8, wherein a type of each ML model is determined based on a fluctuation pattern of a respective cARC that is to be predicted.

11. The non-transitory computer-readable storage medium of claim 10, wherein types of ML models comprise a linear regression model, a kernel regression model, and a deep neural network (DNN).

12. The non-transitory computer-readable storage medium of claim 8, wherein generating a column list based on the column visiting times comprises:

sorting the column visiting times in decreasing order with respect to a percentage each column visiting time is of a total column number; and selecting a sub-set of column visiting times based on a threshold percentage of the total column number, columns represented by column visiting times in the sub-set of column visiting times being included in the column list.

13. The non-transitory computer-readable storage medium of claim 8, wherein loading column data representative of columns included in the column list into low-latency memory comprises:

determining whether the low-latency memory has sufficient space to load all column data of columns included in the column list; and selectively swapping data from the low-latency memory to accommodate all column data of columns included in the column list.

14. The non-transitory computer-readable storage medium of claim 13, wherein selectively swapping data from the low-latency memory comprises executing least recently used (LRU) to move data from the low-latency memory to a data store.

15. A system, comprising:

a computing device; and a computer-readable storage device coupled to the computing device and having instructions stored thereon which, when executed by the computing device, cause the computing device to perform operations for selectively loading data to low-latency memory, the operations comprising:

receiving a workload period representing a period of time, during which a workload is applied to a database system;

providing a set of machine learning (ML) models based on historical data representative of multiple executions of the workload over historical instances of the workload period, each ML model configured to predict a cluster arrival rate curve (cARC); and during execution of the workload period and, for each timeslice of a plurality of timeslice of the workload period:

providing a predicted cARC from each ML model, the predicted cARC representative of a predicted workload for a respective timeslice, determining column visiting times for each of a plurality of columns of each of a plurality of tables stored in the database system, generating a column list based on the column visiting times, and loading column data representative of columns included in the column list into low-latency memory prior to execution of a workload during the respective timeslice.

16. The system of claim 15, wherein providing a set of ML models comprises:

receiving the historical data comprising a set of queries;

providing a set of query templates based on the set of queries;

providing a set of aggregate query templates based on the set of query templates;

determining an arrival rate curve (ARC) for each aggregate query template in the set of aggregate query templates;

providing a set of cARCs, at least one cARC being generated by clustering multiple aggregate query templates and averaging ARCs of the multiple aggregate query templates; and training a ML model for each cARC in the set of cARCs.

17. The system of claim 15, wherein a type of each ML model is determined based on a fluctuation pattern of a respective cARC that is to be predicted.

18. The system of claim 17, wherein types of ML models comprise a linear regression model, a kernel regression model, and a deep neural network (DNN).

19. The system of claim 15, wherein generating a column list based on the column visiting times comprises:

sorting the column visiting times in decreasing order with respect to a percentage each column visiting time is of a total column number; and selecting a sub-set of column visiting times based on a threshold percentage of the total column number, columns represented by column visiting times in the sub-set of column visiting times being included in the column list.

20. The system of claim 15, wherein loading column data representative of columns included in the column list into low-latency memory comprises:

determining whether the low-latency memory has sufficient space to load all column data of columns included in the column list; and selectively swapping data from the low-latency memory to accommodate all column data of columns included in the column list.

* * * * *